United States Patent [19]
Conley

[11] Patent Number: 4,781,127
[45] Date of Patent: Nov. 1, 1988

[54] BENCH GLIDE SYSTEM

[76] Inventor: John L. Conley, 4344 Mission Blvd., Pomona, Calif. 91766

[21] Appl. No.: 859,334

[22] Filed: May 5, 1986

[51] Int. Cl.[4] .............................................. A47B 11/00
[52] U.S. Cl. ...................................... 108/137; 108/143
[58] Field of Search ................... 108/137, 143, 142, 5, 108/102, 70, 73, 74, 78; 312/343; 248/657, 429, 430, 424

[56] References Cited

U.S. PATENT DOCUMENTS

| | | | |
|---|---|---|---|
| 1,252,867 | 1/1918 | Wall | 312/343 X |
| 3,278,248 | 10/1966 | Torok | 312/343 X |
| 3,377,711 | 4/1968 | Wempe | 108/143 X |
| 3,544,186 | 12/1970 | Bjorge | 312/343 X |
| 3,859,932 | 1/1975 | Armstrong et al. | 108/143 X |
| 3,919,949 | 11/1975 | Rendleman | 108/5 X |
| 3,966,050 | 6/1976 | Dahl | 108/102 X |
| 4,130,070 | 12/1978 | Herrin | 108/143 |
| 4,176,890 | 12/1979 | Gorton | 312/343 |
| 4,189,953 | 2/1980 | Volk | 108/143 X |
| 4,568,071 | 2/1986 | Rice | 108/143 X |

FOREIGN PATENT DOCUMENTS

| | | | |
|---|---|---|---|
| 7812330 | 6/1980 | Netherlands | 108/143 |
| 320751 | 10/1929 | United Kingdom | 108/137 |
| 564148 | 9/1944 | United Kingdom | 108/102 |

*Primary Examiner*—Kenneth J. Dorner
*Assistant Examiner*—José V. Chen
*Attorney, Agent, or Firm*—Boniard I. Brown

[57] ABSTRACT

A rolling bench for storing plants in greenhouses and other applications. The rolling bench has a platform stop supported on a base for edgewise movement beyond opposite sides of and restrained against tilting relative to the base by means of an improved roller glide system. This improved roller glide system has parallel rollers disposed between and in rolling contact with the base and top and spacers for retaining the rollers in spaced relation, such that during edgewise adjustment of the top, the rollers undergo rolling movement relative to the base and top along the direction line of movement of the top with the rollers retained in proper spaced relation to rollably support the top throughout a full range of movement.

21 Claims, 2 Drawing Sheets

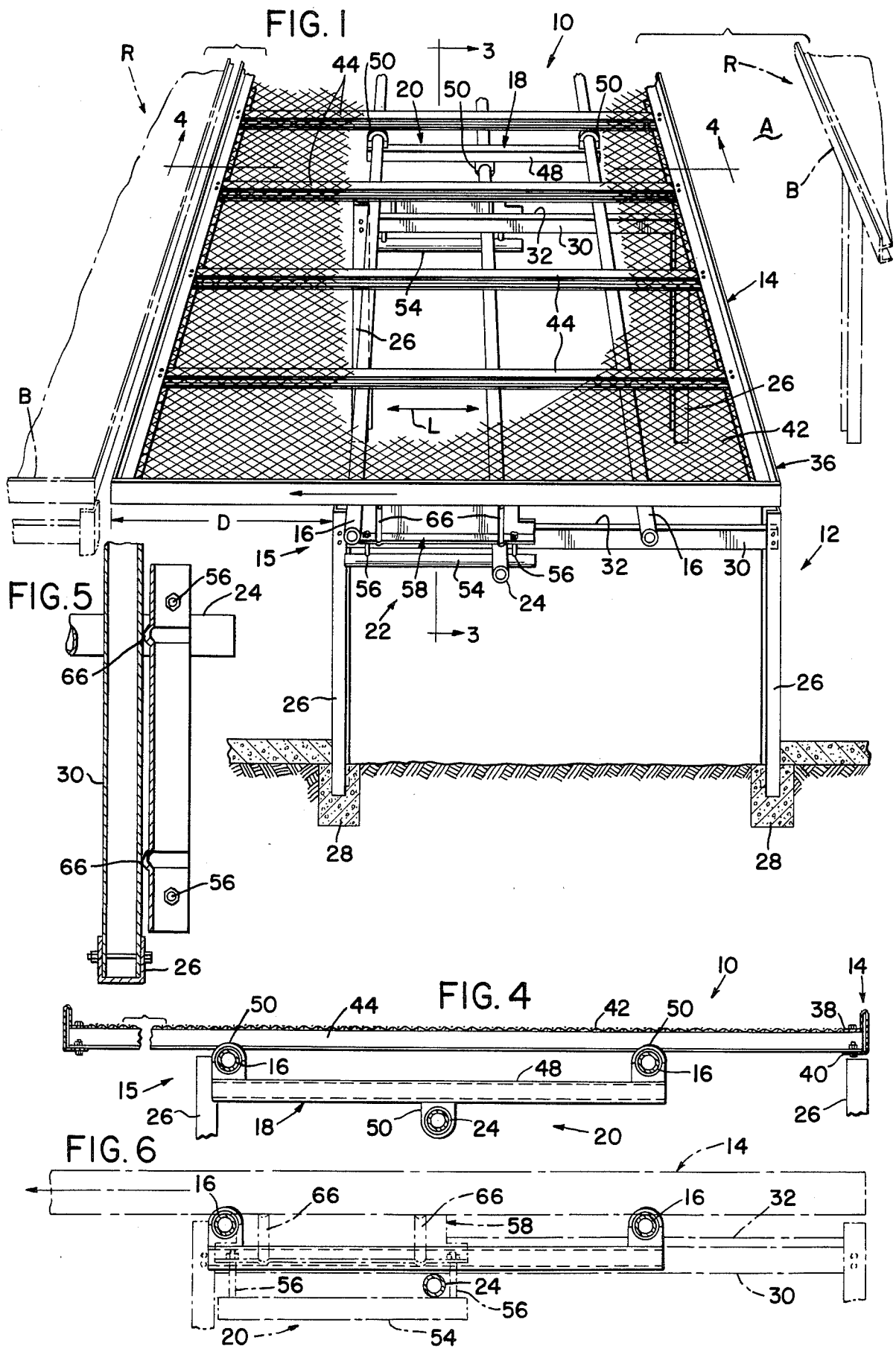

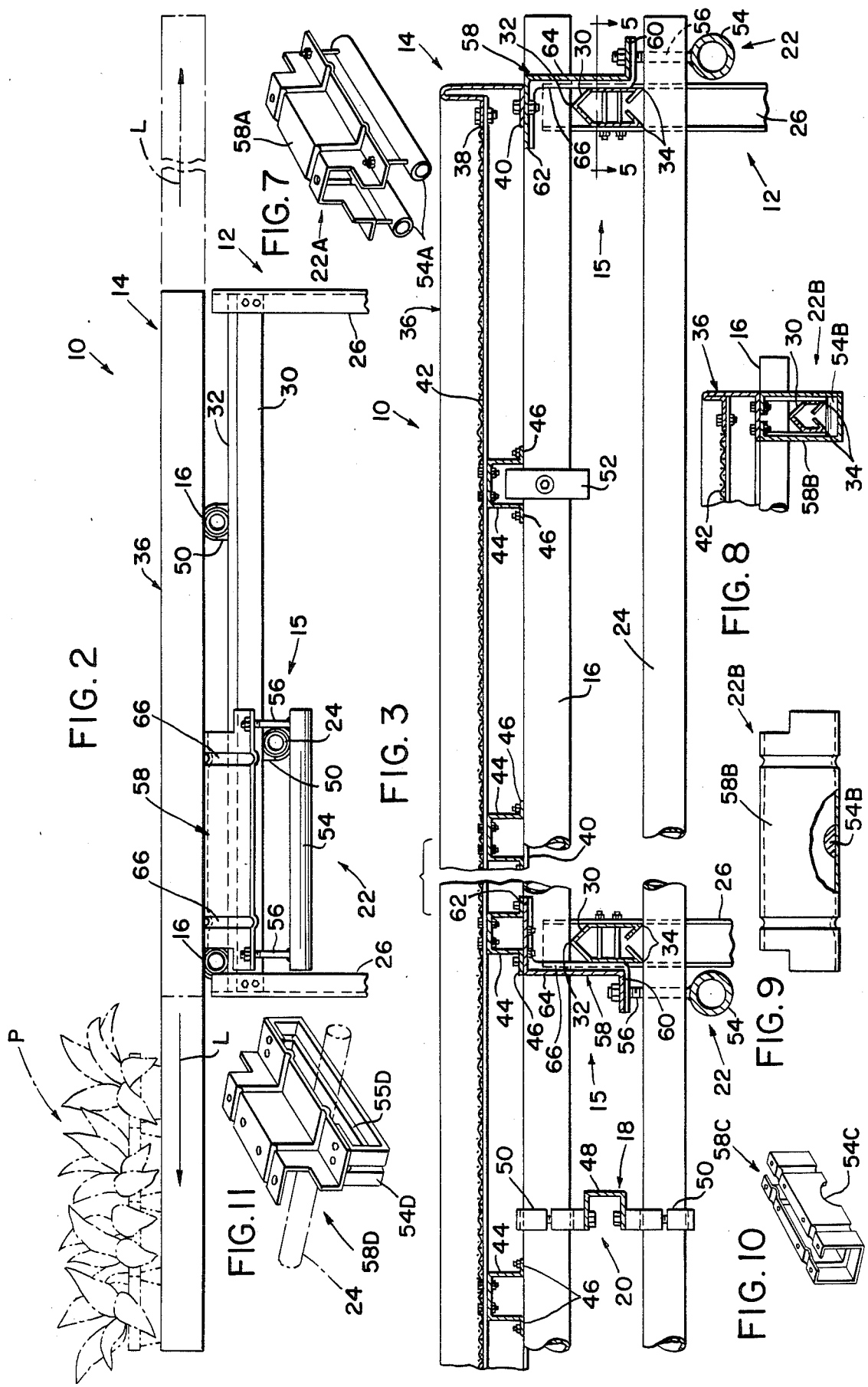

BENCH GLIDE SYSTEM

BACKGROUND OF THE INVENTION

1. Field of the Invention

This invention relates generally to tables of the class which are referred to as benches and more particularly to an improved so-called rolling bench and an improved roller glide system therefor.

2. Prior Art

A bench in the class to which this invention pertains is essentially a relatively long and narrow table having a base and a platform top supported on the base. Benches of this kind are used for a variety of purposes. One widespread application of such benches is supporting or storing plants in greenhouses. The rolling bench of the present invention is particularly adapted for such greenhouse use and will be described in this context. It will become evident as the description proceeds, however, that the invention is not limited to this particular application.

Greenhouses commonly contain a large number of benches for holding plants. These benches are arranged in long rows with aisles between adjacent rows through which persons may walk to provide access to all areas of the benches. Such aisles, of course, consume valuable floor space which is limited by the overall dimensions of the greenhouse.

In order to conserve floor space, so-called rolling benches were devised. A rolling bench is simply a relatively long narrow table or bench whose platform top is supported on the base for edgewise movement laterally of the base between limiting positions wherein the top projects beyond one side or the other of the base. This edgewise adjustability of the top permits a substantial increase in the total square foot bench top area which can be accommodated within a given greenhouse floor area.

More particularly, with fixed top greenhouse benches, the width of each aisle is the space between the adjacent edges of the bench tops at opposite sides of the aisle. Maximum total bench top area for a given greenhouse floor area can be achieved only by making the aisles as narrow as possible and making the bench tops of the maximum width which will permit all areas of the top to be reached from the aisles. The width of the bench base is immaterial as long as it does not project beyond the edges of the bench top.

With a rolling bench, the bench top is adjustable laterally of the base. Maximum total of bench top area is achieved by making the bench top of the maximum width which will permit all areas of the top to be reached from one adjacent aisle or the other and making the width of the base no greater than this maximum top width minus the minimum desired aisle width. The benches at opposite sides of each aisle are located with their bases spaced a distance equal to the desired aisle width.

Each bench top is adjustable laterally of its base between two limiting positions. At each limiting position, one longitudinal side of the top is substantially flush with the adjacent sides of the base and hence clears the adjacent aisle between the bench and the bench at the opposite side of the aisle. The opposite longitudinal side of the bench top projects beyond its adjacent side of the base a distance equal to the difference between the width of the top and the width of the base and across the adjacent aisle.

Consider now a greenhouse having several rows of such rolling benches with aisles between the adjacent rows. Access to any given aisle is achieved by moving the top of the benches at opposite sides of the given aisle away from one another to their opposite limiting positions. This, of course, requires that the tops of the benches in the rows beyond those adjacent the given aisle must be moved outwardly to their corresponding limiting positions.

The net floor space saving achieved with such rolling benches is approximately equal to a number of aisle widths which is one less than the number of rows. Accordingly, the floor space saving can be substantial in large greenhouses.

This invention overcomes certain deficiencies of the existing rolling benches and more particularly the deficiencies of the roller glide systems which support the bench top on the base for adjustment laterally of the base. A typical existing roller glide system for a rolling bench comprises a pair of long slender cylindrical rollers, such as pipes, disposed in substantially parallel relation between and in rolling contact with the bench base and top with the rollers extending lengthwise of the bench. During edgewise movement of the top laterally of the base, these rollers undergo relative rolling movement across the upper side of the base and the underside of the top along the direction line of movement of the top relative to the base.

When the bench top is adjusted to either of its limiting positions, the top projects cantilever fashion beyond the adjacent sides of the base. The downward force on the extending portion of the top, which force, of course, equals the weight of this extending portion plus any plants or the like on the top, produces a tilting moment on the platform tending to lower its extending edge portion and elevate its opposite inboard edge portion which overlies the base. This moment is counteracted by anti-tilt means on the platform which engage the base to restrain the top against tilting.

As noted above, this invention overcomes certain inherent deficiencies in the existing roller bench glide systems. One of these deficiencies resides in the fact that the existing glide system rollers are not restrained against lateral rolling movement relative to one another. As a consequence, when the bench top is moved to either limiting position, its inboard edge portion raises slightly and out of contact with the adjacent inboard glide roller. This frees the inboard roller to roll laterally relative to the other glide roller. Generally, the freed inboard glide roller rolls toward the side of the bench beyond which the bench top projects and thereby toward the other, outboard glide roller. This prevents the top from rolling freely in the opposite direction to its opposite limiting position, particularly when the top is heavily loaded with plants.

Another deficiency of the existing rolling bench glide system involves the anti-tilt means for the bench top. In the existing rolling bench system, this anti-tilt means comprises surfaces on the bench top which engage surfaces on the bench base upon initial tilting movement of the top so as to prevent further tilting of the top. In either limiting positions of the top, these anti-tilt surfaces engage with substantial contact pressure and must slide relative to one another upon inward movement of the top from its current limiting position. This sliding contact of the anti-tilt surfaces creates substantial friction which opposes inward movement of the top, particularly when the top is heavily loaded with plants. In many cases, this friction may be so great as to totally prevent movement of the top from its current limiting position

SUMMARY OF THE INVENTION

This invention provides an improved rolling bench and rolling bench glide system which cure the above noted and other deficiencies of the existing rolling benches. The present improved rolling bench, like the prior rolling benches, has a base, a platform top over the base, and rollers disposed between and in rolling contact with the base and top. These rollers support the top for edgewise movement laterally of the base between a first limiting position in which one longitudinal side of the top projects beyond its adjacent side of the base and the second limiting position in which the opposite longitudinal side of the top projects beyond its adjacent side of the base. These rollers extend lengthwise of the bench and transverse to the direction line of edgewise movement of the top between these limiting positions. During movement of the top relative to the base, the rollers undergo rolling movement along this direction line relative to both the top and the base.

According to a feature of this invention, the rollers of the improved rolling bench are joined by spacers which form with the rollers a roller glide system assembly. These spaces retain the rollers in spaced relation and cause the rollers to roll in unison relative to the base and top during movement of the top relative to the base. This inner connection of the rollers into a roller assembly, with the rollers retained in spaced relation, avoids the problems mentioned earlier of one roller being released to roll toward the other roller as a result of slight tilting of the top upon movement of the latter to one of its limiting positions of extension beyond the base. As noted, when this occurs in the existing rolling benches, it is difficult if not impossible to move the top from its current limiting position, particularly when the top is heavily loaded with plants. In the improved rolling bench of this invention, the rollers are always properly spaced and positioned to enable free rolling movement of the top from either limiting position toward the opposite limiting position According to another feature of this invention, the rolling bench is equipped with improved anti-tilt means for preventing excessive tilting of the bench top when the latter is extended to each of its limiting positions. This improved anti-tilt means includes a novel anti-tilt roller arrangement which resists tilting of the top in its limiting positions without creating sliding friction opposing movement of the top from these limiting positions. As a result, the top of the present improved rolling bench is easily movable throughout the full range of its edgewise movement relative to the bench base even when the top is heavily loaded with plants.

As noted earlier, while the improved rolling bench of the invention is particularly adapted for greenhouse use, it may be used for other purposes as well. Accordingly, the invention should not be regarded as limited to such greenhouse use.

BRIEF DESCRIPTION OF THE DRAWINGS

FIG. 1 is a fragmentary perspective view of an improved rolling bench according to the invention;
FIG. 2 is an end view of the bench;
FIG. 3 is a slightly enlarged section taken on line 3—3 in FIG. 1;
FIG. 4 is a section taken on line 4—4 in FIG. 1;
FIG. 5 is a section taken on line 5—5 in FIG. 3;
FIG. 6 is a view similar to FIG. 4 illustrating a modification of the invention;
FIG. 7 illustrates another modification of the invention;
FIG. 8 illustrates yet another modification of the invention;
FIG. 9 is a fragmentary side view, partly broken away, of FIG. 8;
FIG. 10 illustrates a further modification of the invention; and
FIG. 11 illustrates yet a further modification of the invention.

Turning now to FIGS. 1 through 5 of the drawings, there is illustrated an improved rolling bench 10 according to the invention. The bench has a base 12, a platform top 14 over the base, and an improved roller glide system 15 including roller 16 disposed between and in rolling contact with the top and base supporting the top on the base for edgewise movement of the top relative to the base along a transverse direction line L of the base.

As noted earlier, the particular rolling bench illustrated is intended for greenhouse use and is relatively long and narrow. In a typical greenhouse installation, a number of such rolling benches are arranged end to end in long rows disposed side by side with aisles between the adjacent rows. The drawings illustrate, in phantom lines, two such adjacent rows R of rolling benches B with aisles A between the adjacent rows.

It will become evident as the description proceeds that various forms of rollers may be used on the improved rolling bench of the invention. The particular roller 16 illustrated are long slender cylindrical rollers which conveniently may be pipes. Each roller may extend the full length of the bench. Alternatively, each roller may comprise a number of separate roller sections arranged end to end. During edgewise movement of the bench top 14 laterally of the base 12, the rollers 16 undergo lateral rolling movement along the direction line L relative to both the base and the top.

The bench top 14 is substantially wider than the base 12 and is movable relative to the base between the limiting position shown in FIG. 1 and an opposite limiting position. In the limiting position of FIG. 1, the top 14 projects cantilever fashion a substantial distance D beyond the left side of the base 12. In its opposite limiting position, the top projects cantilever fashion the same distance beyond the opposite or right side of the base.

As noted earlier, in a typical greenhouse installation, rolling benches are arranged in spaced rows with an aisle between the rows through which persons may walk. The bench tops have a width such that all areas of each top may be reached from one or the other of the adjacent aisles.

The rolling benches 10 of the present invention are arranged in parallel rows with the bases 12 of the benches in adjacent rows spaced a distance equal to the desired aisle width. The width of the bench top 14 is made greater than the width of the base 12 by an amount substantially equal to or slightly less than the desired aisle width. This difference between the width of the top 14 and the width of the base 12 is the distance D in FIG. 1. As a consequence, in a greenhouse installation of rolling benches according to this invention, the bench top 14 may be positioned to provide an aisle A between any two adjacent bench rows by moving all of the bench tops at each side of the aisle away from the aisle and to their outboard limiting positions relative to the aisle. FIG. 1, for example, illustrates the rolling bench tops positioned to provide an aisle A between the right side of the bench row containing the rolling bench 10 and the left side of the adjacent bench row (shown in phantom lines). As explained earlier, this use of rolling benches in a greenhouse results in a substantial saving of floor space.

It is evident from FIG. 1 that when the rolling bench top 12 occupies either of its limiting positions, and particularly when the top is loaded with plants P, as shown in FIG. 2, the top is subjected to a substantial tilting moment which tends to tilt downwardly the extending outboard longitudinal edge portion of the top which projects beyond the base and to tilt upwardly the opposite inboard portion of the top. In the existing rolling benches, this tilting moment, though restrained by anti-tilt means, resulted in sufficient tilting of the top to release the inboard roller which then rolls toward the opposite roller and thereby prevented or at least impeded rearward movement of the top from its current limiting position. The present invention avoids this deficiency of the existing rolling benches.

To this end, the roller 16 of the present rolling bench 10 are joined by spacers 18, such that the rollers and spacers together form a roller assembly 20. These spacers retain the rollers in spaced relation throughout the whole range of movement of the bench top 14 between its limiting positions and even though the top tilts slightly when fully extended to either limiting position, such as the lefthand limiting position shown in FIG. 1. This feature of the invention permits easy rolling movement of the bench top 14 throughout its full range of movement even when fully loaded with plants. The improved rolling bench of the invention also includes an improved anti-tilt means 22 for restraining the bench top against tilting when in its extended limiting positions. This anti-tilt means embodies a roller 24 which eliminates sliding friction in the anti-tilt action.

Referring now in more detail to the illustrated rolling bench 10 of the invention, the bench base 12 has an open frame construction including legs 26. These legs are spaced along the bench and are shown to be imbedded in concrete footings 28. The legs are joined at their upper ends by horizontal frame members 30 extending crosswise of the base. Although not necessary when the legs are imbedded in concrete footings, as shown, the legs may also be joined by frame members extending endwise of the bench so as to form a rigid unitary structure.

The cross frame members 30 serve the additional purpose of and will be hereinafter referred to as roll bars for supporting the roller 16. Referring to FIG. 3, each roll bar 30 has an inverted open channel shape. The upper wall of the channel is tapered to form a relatively sharp upper roller supporting edge 32. The lower edges of the channel side walls are formed to provide relatively sharp lower edges 34 for engaging the anti-tilt roller 24, as explained later. The upper roll bar edges 32 are located in a common horizontal plane and support the roller 16 in rolling contact with the edges, as shown in FIG. 3.

The bench top 14 has an open rectangular frame 36 of generally channel section including upper and lower inturned flanges 38, 40. Secured about its edge to the upper flange 38 and spanning the frame 36 is a heavy gauge screen 42. Below the screen 42 at positions along the frame 36 and extending crosswise of the frame and generally parallel to the direction line L of the bench top 10 are a number of cross bars 44. These cross bars engage the underside of and support the screen 42. The ends of the cross bars 44 rest on and are secured to the lower frame flanges 40. Each cross bar has a channel cross section including side walls whose lower edges turn outwardly to form flanges 46. These flanges rest on the rollers 16 to support the bench top 14 on the rollers. The lower flanges 40 of the top frame 36 also rest on the rollers to support the top on the rollers.

From the description to this point, it will be understood that the rollers 16 are disposed between the bench base 12 and the top 14 in rolling contact with the roll bars 30 on the base and the cross bars 44 and frame 36 of the top 14. The rollers support the bench top 14 for edgewise movement along the direction line L relative to the base 12. During this movement of the top 14 relative to the base 12, the rollers 16 roll laterally along the roll bars 30 and the cross bars 44.

As noted earlier, the rollers 16 are joined by the spacer 18 to form a roller assembly 20. Each spacer 18 comprises a bar 48 with upstanding bearings 50 at its ends rotatably mounting the rollers 16 on the bar. There is at least one spacer at each end of the rollers and, if desired, one or more spacers between the roller ends.

One or more of the rollers 16 mounts a collar 52 which engages in the channel of a cross bar 44 on the bench top 14 to restrain the roller 16 against endwise movement relative to the top. The bench top 14 is restrained against endwise movement relative to the bas 12 in the manner explained below.

It will now be understood that the rollers 16 support the bench top 14 for edgewise movement relative to the base 12 along the transverse direction line L of the base. During this edgewise movement of the top 14, the rollers 16 roll in unison relative to the top and the base and along the roll bars 30 and cross bars 44. The spacers 18 retain the rollers in spaced relation throughout the full range of edgewise movement of the top 14. As a consequence, the rollers 16 are always properly positioned to support the top 14 for free rolling movement from one extreme position to the other, even when the top is heavily loaded with plants.

The improved anti-tilt means 22 of the rolling bench 10 comprises the anti-tilt roller 24. This anti-tilt roller is located approximately midway between and parallel to the bench top support rollers 16. The anti-tilt roller is located below the roller spacer bars 48, and these bars have depending bearings 50 supporting the anti-tilt roller, as shown in FIG. 4. Thus, the anti-tilt roller 24 is movable in unison with the bench top support rollers 16.

The anti-tilt roller 24 is located between the roll bars 30 and is upwardly engageable with these bars to restrain the bench top 14 against tilting upon movement of the top to either of its limiting positions of extension beyond the base 12. Below the anti-tilt roller 24 at its ends and at one or more positions along the roller are relatively short horizontal roll bars 54 which parallel the bench roll bars 30. The ends of each anti-tilt roll bar 54 are attached by bolts 56 to a bracket 58 having oppositely directed lower and upper flanges 60, 62 shown in FIG. 3. The roll bar bolts 56 are secured to the lower bracket flanges 60. The upper bracket flanges 62 are attached to the end members of the bench top frame 36.

The upper flange 62 of each intervening bracket 58 is secured to a bench top cross bar 44. As shown in FIG. 3, the vertical wall portion 64 of the brackets 58 are indented at one side at 66 to form at the other side rounded beads which bear slidably against the adjacent roll bar 30 on the base 12 to restrain the bench top 14 against endwise movement relative to the base 12.

When the bench top 12 is extended to either limiting position, such as that shown in FIG. 1 wherein the left side of the top projects a distance D beyond the base, a tilting moment is produced on the top. This tilting moment tends to lower the outboard side of the top (i.e., the left side of the top FIG. 1) and to raise the opposite inboard side. Such tilting of the top is prevented by the anti-tilt means 22. Thus tilting of the bench top in either direction engages the anti-tilt roll bars 54 upwardly against the anti-tilt roller 24 and thereby urges the latter upwardly against the lower base roll bar edges 34 to prevent tilting of the top. If desired, the bearings 50 connecting the anti-tilt roller 24 to the spacer bars 48 for the platform support rollers 16 may be eliminated, as shown in FIG. 6, to free the anti-tilt roller 24 for free floating movement endwise of the anti-tilt roll bars 54.

In FIGS. 1 through 6, the anti-tilt roll bars 54 are pipes or rods. FIG. 7 illustrates a modified anti-tilt means 22A in which the anti-tilt brackets 58A are channeled which straddle their respective base roll bars 30 and mount pairs of anti-tilt roll bars 54A. FIGS. 8 and 9 illustrate a further modified anti-tilt means 22B in which each anti-tilt bracket 58B has an essentially box section, shown best in FIG. 10, which encloses its respective base roll bar 30. The bracket has an arcuate bottom formation 54B which bears against the lower edges 34 of the base roll bars 30. FIG. 10 illustrates a further modified anti-tilt bracket 58C similar to bracket 58B except that its arcuate bottom formation 54C is formed by indenting the bottom wall of the bracket. The modified anti-tilt bracket 58D of FIG. 11 is like the anti-tilt bracket 58 except that the roll bar 54 and bolts 56 of bracket 58 are replaced, in the bracket 58D, by a channel 54D through which the anti-tilt roller 24 extends. The walls of the channel 54D are indented to form a bead 55D which bears against the roller.

The inventor claims:

1. A rolling bench comprising:
a base,
a platform top over said base,
a roller assembly disposed between said base and top and supporting said top on said base for edgewise movement of the top along a given direction line relative to the base, and wherein
said roller assembly is movable along said direction line relative to both said top and base and comprises rollers spaced from one another along said direction line and disposed in peripheral rolling contact with both said top and base for rolling movement of said rollers along said direction line relative to both said top and base during movement of said top along said direction line relative to said base, and spacer means for retaining the rollers in spaced relation along said direction line.

2. A rolling bench according to claim 1 wherein:
said top and base are elongated, and
said rollers comprise long slender cylindrical rollers each extending at least a major portion of the length of said top.

3. A rolling bench according to claim 2 wherein:
said spacer means comprise rigid spacer members extending between and rotatably mounting said rollers.

4. A rolling bench according to claim 1 wherein:
said rollers comprise long slender cylindrical rollers of substantially uniform diameter from end to end, and
means restraining said rollers against endwise movement.

5. A rolling bench according to claim 1 wherein:
said top is movable between limiting positions relative to said base and said top projects beyond said base in at least one limiting position, and
anti-tilt means operatively associated with said top and base for restraining said top against tilting relative to said base in said one limiting position.

6. A rolling bench comprising:
a base,
a platform top over said base,
rollers disposed between and in rolling contact with said base and top and supporting said top on said base for edgewise movement of the top along a given direction line relative to the base, and wherein said rollers are spaced along said direction line with their rotation axes generally parallel to one another and transverse to said direction line, whereby said rollers undergo rolling movement along the direction line relative to the base and top during movement of the top relative to the base,
spacer means joining said rollers for retaining the rollers in spaced relation along said direction line, and wherein
said rollers comprise long slender cylindrical rollers,
said base includes roll bars generally parallel to said direction line and supporting said rollers for rolling movement along said direction line, and
said top includes bars generally parallel to said direction line and resting on said rollers to support the top on the rollers.

7. A rolling bench according to claim 6 wherein:
said roll bars have relatively sharp roller engaging edges.

8. A rolling bench comprising:
a relatively long and narrow base,
a relatively long and narrow top over and wider than said base,
a roller assembly between said base and top supporting the top on the base for edgewise movement of the top relative to the base along a direction line transverse to the length of the base and top between a limiting position wherein the top projects beyond one side of the base and a limiting position wherein the top projects beyond the opposite side of the base, and wherein
said roller assembly is movable relative to and laterally of both said base and top and comprises rollers spaced from one another along said direction line and disposed in peripheral rolling contact with both said base and top for rolling movement of said rollers along said direction line relative to both said top and base during movement of top along said direction line relative to said base, and spacer means for retaining the rollers in spaced relation along said direction line.

9. A rolling bench according to claim 7 wherein:
said rollers comprise long slender rollers extending at least a major portion of the length of said top, and said spacer means comprise rigid spacer members extending between and rotatably mounting said rollers.

10. A rolling bench according to claim 9 including:
means restraining said top against endwise movement relative to said base, and
means restraining said rollers against endwise movement relative to said top and base.

11. A rolling bench according to claim 8 including:
anti-tilt means for restraining said top against tilting relative to said base in said limiting positions of the top.

12. A rolling bench comprising:
a relatively long and narrow base,
a relatively long and narrow top over and wider than said base,
slender cylindrical rollers between and extending endwise of said base and top and disposed in rolling contact with the base and top for supporting the top on the base for edgewise movement of the top relative to the base between a limiting position wherein the top projects beyond one side of the base and a limiting position wherein the top projects beyond the opposite side of the base, and wherein said rollers are spaced laterally of said base and top and undergo rolling movement relative to and laterally of said base top during edgewise movement of the top relative to the base,
spacer means joining said rollers for retaining a fixed spacing between the rollers laterally of said base and top, and wherein
said base includes transverse roll bars spaced along the base and supporting said rollers for rolling movement laterally of the base, and
said top includes transverse bars spaced along the top and resting on said rollers to support the top for movement laterally of the base.

13. A rolling bench comprising:
a relatively long and narrow base,
a relatively long and narrow top over and wider than said base,
slender cylindrical rollers between and extending endwise of said base and top and disposed in rolling contact with the base and top for supporting the top on the base for edgewise movement of the top relative to the base between a limiting position wherein the top projects beyond side of the base and a limiting position wherein the top projects beyond the opposite side of the base, and wherein said rollers are spaced laterally of said base and top and undergo rolling movement relative top and laterally of said base and top during edgewise movement of the top relative to the base,
spacer means joining said rollers for retaining a fixed spacing between the rollers laterally of said base and top,
means restraining said top against endwise movement relative to said base,
means restraining said rollers against endwise movement relative to said top and base, and wherein
said base includes transverse roll bars spaced along the base and supporting said rollers for rolling movement laterally of the base,
said top includes transverse bars spaced along the top and resting on said rollers to support the top for movement laterally of the base,
said top restraining means comprises depending members on said top laterally engageable with said base roll bars, and
said roller restraining means comprise collars on said rollers engageable with said top bars.

14. A rolling bench comprising:
a base,
a platform top over said base,
rollers disposed between and in rolling contact with said base and top and supporting said top on said base for edgewise movement of the top along a given direction line relative to the base, and wherein said rollers are spaced along said direction line with their rotation axes generally parallel to one another and transverse to said direction line, whereby said rollers undergo rolling movement along the direction line relative to the base and top during movement of the top relative to the base,
spacer means joining said rollers for retaining the rollers in spaced relation along said direction line, and wherein
said top is movable between limiting positions relative to said base and said top projects beyond said base in at least one limiting position,
anti-tilt means operatively associated with said top and base for restraining said top against tilting relative to said base in said one limiting position,
said anti-tilt means comprise an anti-tilt roller generally parallel to said top support rollers and disposed between said base and top anti-tilt members parallel to said direction line including upper anti-tilt members on said base above and spaced along said anti-tilt roller and lower anti-tilt members on said top below and spaced along said anti-tilt roller for upward engagement of said lower anti-tilt members with said anti-tilt roller and resulting upward engagement of said anti-tilt rollers against said upper anti-tilt members to resist tilting of said top.

15. A rolling bend according to claim 14 wherein:
said spacer means join said top support rollers and said anti-tilt roller for retaining said rollers in spaced parallel relation.

16. A rolling bench comprising:
a relatively long and narrow base,
a relatively long and narrow top over and wider than said base,
slender cylindrical rollers between and extending endwise of said base and top and disposed in rolling contact with the base and top for supporting the top on the base for edgewise movement of the top relative to the base between a limiting position wherein the top projects beyond one side of the base and a limiting position wherein the top projects beyond the opposite side of the base, and wherein said rollers are spaced laterally of said base and top and undergo rolling movement relative to and laterally of said base and top during edgewise movement of the top relative to the base,
spacer means joining said rollers for retaining a fixed spacing between the rollers laterally of said base and top,
anti-tilt means for restraining said top against tilting relative to said base in said limiting positions of the top, and wherein
said top is movable relative to said base along a transverse direction line of the base, and
said anti-tilt means comprise members on said base generally parallel to said direction line, members on said top generally parallel to said direction line and disposed below said base members, said base members being spaced along said rollers and said top members being spaced along said rollers, and an anti-tilt roller generally parallel to said top support rollers and disposed between said base and top members for upward engagement of said top members with said anti-tilt roller and resulting upward engagement of said anti-tilt roller against said base members to resist tilting of said top.

17. A rolling bench comprising:

a base, a platform top over said base, rollers disposed between and in rolling contact with said base and top and supporting said top on said base for edgewise movement of the top along a given direction line relative to the base, and wherein said rollers are space along said direction line with their rotation axes generally parallel to one another and transverse to said direction line, whereby said rollers undergo rolling movement along the direction line relative to the base and top during movement of the top relative to the base, spacer means joining said rollers for retaining the rollers in spaced relation along said direction line, and wherein said top is movable between limiting positions relative to said base and said top projects beyond said base in at least one limiting position, anti-tilt means operatively associated with said top and base for restraining said top against tilting relative to said base in said one limiting position, said anti-tilt means comprise members on said base generally parallel to said direction line, members on said top generally parallel to said direction line and disposed below said base members, said base members being spaced along said rollers and said top members being spaced along said rollers, and an anti-tilt roller generally parallel to said top support rollers and disposed between said base and top members for upward engagement of said top members with said anti-tilt roller and resulting upward engagement of said anti-tilt roller against said base members to resist tilting of said top, and said spacer means join said top support rollers and said anti-tilt roller for retaining said rollers in spaced parallel relation.

18. A rolling glide assembly for a rolling bench having a base and a platform top over base, said roller assembly comprising:

laterally spaced rollers having parallel rotation axes and adapted to be disposed between and in rolling contact with said base and top for supporting said top on said base for edgewise movement of the top relative to the base along a direction line transverse to said roller axes, spacer means joining said rollers for retaining the rollers in laterally spaced relation, and wherein said assembly further includes roll bars supporting said rollers for rolling movement along the bars, means for mounting said roll bars on said base, additional bars generally parallel to said roll bars resting on said rollers, and means for mounting said additional bars on said top for supporting the top on the rollers.

19. A rolling glide assembly according to claim 18 wherein:

said rollers comprise long slender cylindrical rollers, and said assembly further includes means restraining said rollers against endwise movement relative to said bars.

20. A rolling glide assembly according to claim 19 including:

anti-tilt means spaced along said rollers each comprising first members generally parallel to said bars, means for mounting said members on said base, second members generally parallel to said bars and disposed below said first members, means for mounting said second members on said top, said members being spaced along said rollers and an anti-tilt roller generally parallel to said first rollers and disposed between said members for upward engagement of said second members with said anti-tilt roller and resulting upward engagement of said anti-tilt roller against said first members to resist tilting of said top.

21. A rolling glide assembly according to claim 20 wherein:

said spacer means join said top support rollers and said anti-tilt roller for retaining said rollers in spaced parallel relation.

* * * * *